(12) United States Patent
Takahashi et al.

(10) Patent No.: US 8,179,501 B2
(45) Date of Patent: May 15, 2012

(54) LIQUID CRYSTAL DISPLAY DEVICE HAVING AN ELLIPTICAL POLARIZER WITH FIRST AND SECOND ANISOTROPIC LAYERS

(75) Inventors: Yuji Takahashi, Yokohama (JP); Satoru Ikeda, Yokohama (JP); Tetsuya Uesaka, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 278 days.

(21) Appl. No.: 12/674,799

(22) PCT Filed: Aug. 18, 2008

(86) PCT No.: PCT/JP2008/065058
§ 371 (c)(1),
(2), (4) Date: Feb. 23, 2010

(87) PCT Pub. No.: WO2009/028428
PCT Pub. Date: Mar. 5, 2009

(65) Prior Publication Data
US 2011/0116004 A1 May 19, 2011

(30) Foreign Application Priority Data

Aug. 31, 2007 (JP) ................................. 2007-225063
Jan. 24, 2008 (JP) ................................. 2008-013905

(51) Int. Cl.
G02F 1/1335 (2006.01)

(52) U.S. Cl. ........................... 349/96; 349/101; 349/102

(58) Field of Classification Search .............. 349/96–99, 349/101, 102, 123–127
See application file for complete search history.

(56) References Cited

U.S. PATENT DOCUMENTS 5,193,020 A 3/1993 Shiozaki et al.
5,413,657 A 5/1995 Yamanashi et al.
(Continued)

FOREIGN PATENT DOCUMENTS

EP 0 350 383 A2 1/1990
(Continued)

OTHER PUBLICATIONS

U.S. Office Action issued Nov. 30, 2004 in U.S. Appl. No. 10/791,113.
(Continued)

*Primary Examiner* — Mark Robinson
*Assistant Examiner* — Paul Lee
(74) *Attorney, Agent, or Firm* — Panitch Schwarze Belisario & Nadel LLP (57) ABSTRACT

An elliptical polarizer is provided having excellent viewing angle improving effects. The elliptical polarizer includes a polarizer, a first optical anisotropic layer, and a second optical anisotropic layer, laminated in this order. The first optical anisotropic layer satisfies the requirements of $0.8 \leq NZ1 \leq 1.6$ and $120 \leq Re1 \leq 250$ and is disposed so that the slow axis thereof is orthogonal to the absorption axis of the polarizer. The second optical anisotropic layer is a liquid crystal film having a retardation value in the plane of 30 to 150 nm with respect to a 550 nm wavelength light and fixed in a nematic hybrid alignment wherein the average tilt angle of the liquid crystal molecules of a liquid crystalline polymer exhibiting a positive optical uniaxiality, and is disposed so that the aligned direction thereof is parallel to the absorption axis of the first polarizer. The elliptical polarizer is used in a TN type liquid crystal display device so that the second optical anisotropic layer is disposed on the liquid crystal cell side.

13 Claims, 6 Drawing Sheets

U.S. PATENT DOCUMENTS

| | | | |
|---|---|---|---|
| 5,519,523 A | 5/1996 | Madokoro et al. | |
| 5,699,136 A | 12/1997 | Arakawa et al. | |
| 6,208,396 B1 | 3/2001 | Shimizu et al. | |
| 6,320,634 B1 | 11/2001 | Winker et al. | |
| 7,732,024 B2 | 6/2010 | Mazaki et al. | |
| 7,880,839 B2 | 2/2011 | Nakamura | |
| 7,898,620 B2 | 3/2011 | Ikeda et al. | |
| 2001/0048497 A1 | 12/2001 | Miyachi et al. | |
| 2005/0225706 A1 | 10/2005 | Miyachi et al. | |
| 2007/0263152 A1* | 11/2007 | Mazaki et al. | 349/130 |
| 2009/0091691 A1 | 4/2009 | Sato et al. | |
| 2009/0251642 A1 | 10/2009 | Nakamura et al. | |
| 2010/0026936 A1 | 2/2010 | Uesaka et al. | |
| 2010/0085522 A1 | 4/2010 | Uesaka et al. | |
| 2010/0171916 A1 | 7/2010 | Mazaki et al. | |
| 2010/0182544 A1 | 7/2010 | Ikeda et al. | |
| 2010/0309414 A1 | 12/2010 | Tomonaga et al. | |

FOREIGN PATENT DOCUMENTS

| | | |
|---|---|---|
| EP | 0 482 620 A2 | 4/1992 |
| EP | 1644439 A1 | 4/2006 |
| JP | 63-239421 A | 10/1988 |
| JP | 02-015239 A | 1/1990 |
| JP | 03-103823 A | 4/1991 |
| JP | 04003001 A | 1/1992 |
| JP | 04057017 A | 2/1992 |
| JP | 05-080323 A | 4/1993 |
| JP | 05-157911 A | 6/1993 |
| JP | 5333313 A | 12/1993 |
| JP | 06-214116 | 8/1994 |
| JP | 07261023 A | 10/1995 |
| JP | 07-306406 A | 11/1995 |
| JP | 08278491 A | 10/1996 |
| JP | 10-123506 A | 5/1998 |
| JP | 2000347027 A | 12/2000 |
| JP | 2002-040428 A | 2/2002 |
| JP | 2002-055342 A | 2/2002 |
| JP | 2002214439 A | 7/2002 |
| JP | 2002258269 A | 9/2002 |
| JP | 2003-207782 A | 7/2003 |
| JP | 2005-004096 A | 1/2005 |
| JP | 2005-062668 A | 3/2005 |
| JP | 2005-062672 A | 3/2005 |
| JP | 2005-189633 A | 7/2005 |
| JP | 2005-202101 A | 7/2005 |
| JP | 2006-085203 A | 3/2006 |
| JP | 2006-098946 A | 4/2006 |
| JP | 2008-129175 A | 6/2008 |
| JP | 2008-129176 A | 6/2008 |
| WO | 96/10773 A1 | 4/1996 |
| WO | 0146720 A1 | 6/2001 |

OTHER PUBLICATIONS

Int'l Search Report issued on Jun. 30, 2009 in Int'l Application No. PCT/JP2009/001797.
U.S. Appl. No. 12/994,190, filed Nov. 23, 2010.
Office Action issued Nov. 18, 2011 in U.S. Appl. No. 12/515,107.
Notice of Allowance issued Nov. 18, 2011 in U.S. Appl. No. 12/994,190.

* cited by examiner

| 9. Transparent protection film | |
|---|---|
| 7. First polarizing element | |
| 12. First optical anisotropic layer | 15. Elliptical polarizer |
| 11. Second optical anisotropic layer | |
| 2. Substrate | |
| 4. Counter electrode | |
| 5. Liquid crystal layer | 6. Liquid crystal cell |
| 3. Transparent electrode | |
| 1. Substrate | |
| 13. Second optical anisotropic layer | |
| 14. First optical anisotropic layer | 16. Elliptical polarizer |
| 8. Second polarizing element | |
| 10. Transparent protection film | |
| 17. Backlight | |

| |
|---|
| 9. Transparent protection film |
| 7. First polarizing element |
| 11. Second optical anisotropic layer |
| 12. First optical anisotropic layer |
| 2. Substrate |
| 4. Counter electrode |
| 5. Liquid crystal layer |
| 3. Transparent electrode |
| 1. Substrate |
| 14. First optical anisotropic layer |
| 13. Second optical anisotropic layer |
| 8. Second polarizing element |
| 10. Transparent protection film |
| 17. Backlight |

6. Liquid crystal cell (brackets grouping items 2, 4, 5, 3, 1)

| |
|---|
| 9. Transparent protection film |
| 7. First polarizing element |
| 11. Second optical anisotropic layer |
| 2. Substrate |
| 4. Counter electrode |
| 5. Liquid crystal layer |
| 3. Transparent electrode |
| 1. Substrate |
| 13. Second optical anisotropic layer |
| 8. Second polarizing element |
| 10. Transparent protection film |
| 17. Backlight |

{ 2. Substrate, 4. Counter electrode, 5. Liquid crystal layer, 3. Transparent electrode, 1. Substrate } 6. Liquid crystal cell

LIQUID CRYSTAL DISPLAY DEVICE HAVING AN ELLIPTICAL POLARIZER WITH FIRST AND SECOND ANISOTROPIC LAYERS

CROSS-REFERENCE TO RELATED APPLICATIONS

This application is a Section 371 of International Application No. PCT/JP/2008/065058, filed Aug. 18, 2008, which was published in the Japanese language on Mar. 5, 2009, under International Publication No. WO 2009/028428 A1 and the disclosure of which is incorporated herein by reference.

FIELD OF THE INVENTION

The present invention relates to elliptical polarizers comprising two optical anisotropic layers and liquid crystal display devices equipped with such elliptical polarizers, with excellent viewing angle characteristics, in particular to TN type liquid crystal display devices.

BACKGROUND OF THE INVENTION

Currently, liquid crystal display devices (hereinafter also referred to as "LCD") that are most commonly used are twisted-nematic type LCDs (hereinafter also referred to as "TN-LCD") of normally white (hereinafter also referred to as "NW") mode. This NW mode TN-LCD has a liquid crystal cell comprises a nematic liquid crystal sandwiched between a pair of glass substrates forming transparent electrodes. The nematic liquid crystal has such an aligned structure that it has a helical axis in the normal line direction of the glass substrates and the twisted angle is about 90°. The liquid crystal cell is sandwiched between a pair of linear polarizers disposed so that their absorption axes are orthogonal to each other. When no electric voltage is applied to the NW mode TN-LCD, it operates in a white state because linearly polarized incident light is rotated by 90° due to the optical rotation characteristics of the liquid crystal cell and then exits. When an electric voltage is applied, liquid crystal molecules arise with respect to the glass substrates, and the optical rotation characteristics are lost. As the result, since linearly polarized incident light passes through the cell as it is, the NW mode TN-LCD operates in a black state. The use of the white and black states and an intermediate state therebetween enables gradation displaying.

However, the nematic liquid crystal used in the LCD has a rod-like molecular structure and exhibits a positive refractive index anisotropy having a large refractive index in the direction of the molecular axis. Therefore, the polarization state of light obliquely passing through the LCD changes in a direction different from the normal line direction thereof due to the retardation caused by the refractive index anisotropy of the liquid crystal. Accordingly, when the image produced by the LCD is viewed at an angle deviating from the normal line direction thereof, the LCD exhibits unfavorable viewing angle characteristics, that is phenomena such as reduced contrast and inverted gradation displaying. For improving viewing angle characteristics, a significant effect therefore can be achieved by improving the viewing angle characteristics during black displaying, i.e., when an electric voltage is applied. When an electric voltage is applied, the liquid crystal molecules are aligned nearly vertically with respect to the glass substrates. Therefore, the aligned molecules are regarded as exhibiting a positive refractive index anisotropy having an optical axis in the normal line direction of the glass substrates, and methods for compensating for such an anisotropy have been reported in which to use a retardation film having an optical axis in the normal line direction thereof and a negative refractive index anisotropy (see Patent Document Nos. 1 and 2 below). However, since in an actual LCD, the liquid crystal molecules near the glass substrates remain tilted due to the binding force of the alignment films formed thereon even when an electric voltage is applied, it is difficult to compensate sufficiently for the polarization state caused by the liquid crystal cell only using the retardation film having an optical axis in the normal line direction thereof and a negative refractive index anisotropy.

Methods have also been proposed in which to use a liquid crystal film of disc-shaped liquid crystal molecules with an optical axis tilted from the normal line direction thereof and a negative refractive index anisotropy in order to also compensate for the above-described tilted liquid crystal molecules (see Patent Document Nos. 3 and 4 below). However, although these methods can improve the compensation for the liquid crystal cell when applied with an electric voltage, it is costly to synthesize and form disc-shaped liquid crystal molecules into a film, and compensation becomes insufficient in an intermediate gradation displaying state that is a more complex aligned configuration wherein the number of the tilted liquid crystal portion increases, due to a lower applied electric voltage. It is thus difficult to improve the inverted gradation phenomenon while the viewing angle characteristics of display contrast can be improved. As the result, only insufficient viewing angle characteristics can be obtained.

As alternative methods, it has been reported that the viewing angle characteristics can also be improved using a retardation plate having an optical axis tilted from the normal line direction thereof and still having the same positive refractive index anisotropy as the liquid crystal does (see, Patent Document Nos. 5, 6 and 7).

Although these reports describe that the use of a retardation plate having a positive refractive index anisotropy and an optical axis tilted from the normal line direction thereof is effective in restraining the gradation inversion of a liquid crystal cell, the methods described in these reports can only provide insufficient viewing angle characteristics for those of display contrast.

Patent Document No. 8 proposes a liquid crystal display device with the combination of a retardation plate wherein liquid crystal molecules having a positive refractive index anisotropy are obliquely aligned and a uniaxial film, which device comprises a polarizer/an obliquely aligned film/a uniaxial film/a TN liquid crystal cell/a uniaxial film/an obliquely aligned film/a polarizer. However, this configuration is not enough to completely compensate for the viewing angle of display contrast and can only provide for incomplete viewing angle characteristics.

As described above, with regard to the optical compensation plate used for improving the viewing angle characteristics of an TN-LCD, no optical compensation plate has not been found yet which can drastically improve viewing angle characteristics including not only display contrast but also gradation inversion. Therefore, further improvements have been required for the optical compensation plate.

(1) Patent Document 1: Japanese Laid-Open Patent Publication No. 2-015239

(2) Patent Document 2: Japanese Laid-Open Patent Publication No. 3-103823

(3) Patent Document 3: Japanese Laid-Open Patent Publication No. 63-239421

(4) Patent Document 4: Japanese Laid-Open Patent Publication No. 6-214116

(5) Patent Document 5: Japanese Laid-Open Patent Publication No. 5-080323
(6) Patent Document 6: Japanese Laid-Open Patent Publication No. 7-306406
(7) Patent Document 7: WO96/10773
(8) Patent Document 8: Japanese Laid-Open Patent Publication No. 10-123506

BRIEF SUMMARY OF THE INVENTION

The present invention has an object to provide an elliptical polarizer that can significantly improve viewing characteristics for both contrast and gradation inversion when disposed on a liquid crystal cell and a liquid crystal display device equipped with such an elliptical polarizer, that is higher in contrast and less in viewing angle dependency.

As the result of extensive study and research in view of these circumstances, the present invention has been accomplished on the basis of the finding that viewing angle characteristics of both display contrast and gradation inversion can be drastically improved by combining an optical anisotropic layer with an NZ coefficient of 0.8 to 1.6 and an optical anisotropic layer with a fixed nematic hybrid alignment structure formed with a liquid crystalline polymer having an optically positive uniaxiality while the polymer is in a liquid crystal state, and by laminating these anisotropic layers with such different characteristics with respect to a polarizer and a liquid crystal cell in a specific order.

That is, means for achieving the foregoing object are as follows:

(1) an elliptical polarizer comprising:
a polarizer;
a first optical anisotropic layer; and
a second optical anisotropic layer, laminated in this order,
the first optical anisotropic layer satisfying the requirements [1] and [2] below and being disposed so that the slow axis thereof is orthogonal to the absorption axis of the polarizer, the second optical anisotropic layer being a liquid crystal film having a retardation value in the plane of 30 to 150 nm with respect to a 550 nm wavelength light and fixed in a nematic hybrid alignment wherein the average tilt angle of the liquid crystal molecules of a liquid crystalline polymer exhibiting a positive optical uniaxiality is from 5° to 50° and being disposed so that the aligned direction of the second optical anisotropic layer is parallel to the absorption axis of the polarizer, and the elliptical polarizer being used in a twisted nematic (TN) type liquid crystal display device so that the second optical anisotropic layer is disposed on the liquid crystal cell side of the device:

$$0.8 \leq NZ1 \leq 1.6 \quad [1]$$

$$120 \leq Re1 \leq 250 \quad [2]$$

wherein $NZ1=(nx1-nz1)/(nx1-ny1)$, Re1 indicates the retardation value in the plane of the first optical anisotropic layer defined by $Re1=(nx1-ny1) \times d1$ [nm] wherein d1 indicates the thickness [nm] of the first optical anisotropic layer, nx1 and ny1 indicate the main refractive indices in the plane of the first optical anisotropic layer with respect to a 550 nm wavelength light, nz1 indicates the main refractive index in the thickness direction of the first optical anisotropic layer with respect to a 550 nm light, and $nx1>ny1$;

(2) the elliptical polarizer according to (1) above, wherein the first optical anisotropic layer comprises a thermoplastic polymer containing a cyclic polyolefin resin;

(3) the elliptical polarizer according to (1) above, wherein the first optical anisotropic layer comprises a thermoplastic polymer containing a cellulosic resin;

(4) a TN type liquid crystal display device containing at least one elliptical polarizer according to (1) above;

(5) a TN type liquid crystal display device comprising:
a first polarizer;
a first optical anisotropic layer;
a second optical anisotropic layer;
a TN type liquid crystal cell;
a second optical anisotropic layer;
a first optical anisotropic layer;
a second polarizer; and
a backlight, arranged in this order from the viewing side,
the first optical anisotropic layers satisfying the requirements [1] and [2] below, the first optical anisotropic layer on the viewing side being disposed so that the slow axis thereof is orthogonal to the absorption axis of the first polarizer, the first optical anisotropic layer on the backlight side being disposed so that the slow axis thereof is orthogonal to the absorption axis of the second polarizer, each of the second optical anisotropic layers being a liquid crystal film having a retardation value in the plane of 30 to 150 nm with respect to a 550 nm wavelength light and fixed in a nematic hybrid alignment wherein the average tilt angle of the liquid crystal molecules of a liquid crystalline polymer exhibiting a positive optical uniaxiality is from 5° to 50°, the second optical anisotropic layer on the viewing side being disposed so that the aligned direction thereof is parallel to the absorption axis of the first polarizer, and the second optical anisotropic layer on the backlight side being disposed so that the aligned direction thereof is parallel to the absorption axis of the second polarizer:

$$0.8 \leq NZ1 \leq 1.6 \quad [1]$$

$$120 \leq Re1 \leq 250 \quad [2]$$

wherein $NZ1=(nx1-nz1)/(nx1-ny1)$, Re1 indicates the retardation value in the plane of each of the first optical anisotropic layers defined by $Re1=(nx1-ny1) \times d1$ [nm] wherein d1 indicates the thickness [nm] of each of the first optical anisotropic layers, nx1 and ny1 indicate the main refractive indices in the plane of each of the first optical anisotropic layers with respect to a 550 nm wavelength light, nz1 indicates the main refractive index in the thickness direction of each of the first optical anisotropic layers with respect to a 550 nm light, and $nx1>ny1$;

(6) the TN type liquid crystal display device according to (4) or (5) above, wherein the first optical anisotropic layers each comprise a thermoplastic polymer containing a cyclic polyolefin resin;

(7) the TN type liquid crystal display device according to (4) or (5) above, wherein the first optical anisotropic layers each comprise a thermoplastic polymer containing a cellulosic resin; and (8) the TN type liquid crystal display device according to any one of (4) to (7) above, wherein upon application of no electric voltage, the aligned direction of the liquid crystal molecules on the cell substrate on the viewing side, in the TN type liquid crystal cell is antiparallel to the aligned direction of the liquid crystal film fixed in a nematic hybrid alignment forming the second optical anisotropic layer on the viewing side, and the aligned direction of the liquid crystal molecules on the cell substrate on the backlight side is antiparallel to the aligned direction of the liquid crystal film fixed in a nematic hybrid alignment forming the second optical anisotropic layer on the backlight side.

The present invention can provide an elliptical polarizer that can significantly improve viewing characteristics of both contrast and gradation inversion when disposed on a liquid crystal cell and a liquid crystal display device equipped with such an elliptical polarizer, that is higher in contrast and less in viewing angle dependency.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention will be described in more detail below.

The elliptical polarizer of the present invention comprises at least a transparent protection film, a polarizing element, a first optical anisotropic layer with an NZ coefficient of 0.8 to 1.6, and a second optical anisotropic layer that is a liquid crystal film wherein a liquid crystalline polymer having an optical positive uniaxiality is fixed in a nematic hybrid alignment structure.

Figure 1:
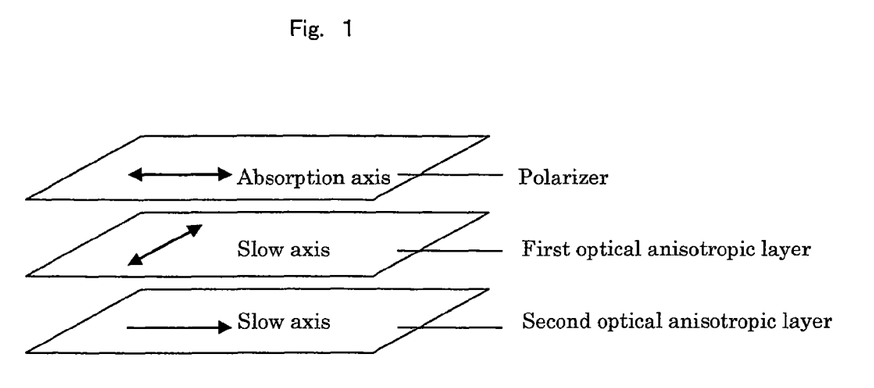
FIG. 1 is a conceptual view of an elliptical polarizer according to the present invention.

Referring to FIG. 1, the elliptical polarizer will be described. As shown in FIG. 1, the elliptical polarizer has a structure wherein a polarizer, a first optical anisotropic layer and a second optical anisotropic layer are laminated in this order. The polarizer may comprises a polarizing element having on its either or both surfaces a transparent protection film. When a transparent protection film is arranged on only one surface, the first optical anisotropic layer also acts as a protection film for the polarizing element. The elliptical polarizer may have a transparent protection film between the polarizing element and the first optical anisotropic layer. However, it is preferable to arrange the first optical anisotropic layer directly on the polarizing element in view of durability and thickness. The elliptical polarizer is so constructed that the slow axis of the first optical anisotropic layer is orthogonal to the absorption axis of the polarizer and the slow axis of the second optical anisotropic layer is parallel to the absorption axis of the polarizer.

For the order of laminating the optical anisotropic layers with respect to the polarizer in the elliptical polarizer shown in FIG. 1, they are preferably laminated in the order of the first optical anisotropic layer and the second anisotropic layer from the polarizer with the objective of restraining contrast reduction and color shift when the elliptical polarizer is mounted in a liquid crystal display device. In FIG. 1, the polarizer, first optical anisotropic layer and second optical anisotropic layer are laminated via a tacky adhesive layer or an adhesive layer. The tack adhesive layer or adhesive layer may be a single layer or may be in a superimposed structure of two or more layers.

Hereinafter, components used in the present invention will be described in order.

The polarizer used in the present invention comprises a polarizing element having on its either or both surfaces a transparent protection film.

There is no particular restriction on the polarizing element, and thus various types of polarizing elements may be used. Examples of the polarizing element include those produced by stretching uniaxially a hydrophilic polymer film such as a polyvinyl alcohol-based film, a partially formalized polyvinyl alcohol-based film or an ehtylene-vinyl acetate copolymer-based partially saponified film to which a dichroic substance such as iodine or a dichroic dye is allowed to absorb; and polyene-based aligned films such as dehydrated products of polyvinyl alcohol and dehydrochlorinated products of polyvinyl chloride. Among these polarizing elements, it is suitable to use those produced by stretching and aligning a polyvinyl alcohol-based film to which a dichroic substance (iodine or dye) is allowed to absorb. There is no particular restriction on the thickness of the polarizing element. It is, however, common to use a polarizing element with a thickness of 5 to 80 μm.

The polarizing element wherein a polyvinyl alcohol is dyed with iodine and uniaxially stretched may be produced by dipping a polyvinyl alcohol in an aqueous solution of iodine to be dyed and stretching it 3 to 7 times longer than the original length. If necessary, the polyvinyl alcohol-based film may be dipped in a solution of boric acid or potassium iodide. Further if necessary, the polyvinyl alcohol-based film may be dipped in water to be washed before dyeing. Washing of the polyvinyl alcohol-based film can remove stains thereon and a blocking inhibitor and swells the film thereby providing an effect to prevent uneven dyeing. Stretching may be carried out after or while dyeing with iodine or followed by dyeing with iodine. Alternatively, stretching may be carried out in an aqueous solution of boric acid or iodine or a water bath.

The polarizing element has on its either or both surfaces a transparent protection film. The protection film is preferably excellent in transparency, mechanical strength, thermal stability, moisture shielding capability, and isotropy. Examples of materials of the protection film include polyester-based polymers such as polyethylene terephthalate and polyethylene naphthalate; cellulose-based polymers such as diacetyl cellulose and triacetyl cellulose; acryl-based polymers such as ploymethyl methacrylate; styrene-based polymers such as polystyrene and acrylonitrile styrene copolymers (AS resin); and polycarbonate-based polymers. Another examples of polymers used for forming the transparent protection film include polyolefin-based polymers such as cyclic polyolefins having a cycloalkane structure or a norbornene structure, polyethylenes, polypropylenes and ethylene propylene copolymers; vinyl chloride-based polymers; amide-based polymers such as nylon and aromatic polyamides; imide-based polymers; sulfone-based polymers; polyether sulfone-based polymers; polyetheretherketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blends of these polymers. Another examples include those produced by forming acryl-, urethane-, acrylurethane-, epoxy-, and silicone-based thermal or ultraviolet curing type resins, into film shapes.

Particularly preferred transparent protection films are triacetyl cellulose films and cyclic polyolefins having a norbornene structure in view of planarity, polarization characteristics and durability. The thickness of the protection film can be appropriately selected but is generally on the order of 10 to 500 μm in view of workability such as strength or treatability and with the objective of making the film thinner. The thickness is particularly preferably from 10 to 300 μm, more preferably from 10 to 200 μm.

The transparent protection film is preferably colorless as much as possible. Therefore, it is preferable to use a transparent protection film with a retardation value in the film thickness direction of −10 nm to +100 nm, which value is represented by $Rth=[(nx+ny)/2-nz]\times d$ (nx and ny indicate the main refractive indices in the film plane, nz indicates the refractive index in the thickness direction of the film, and d indicates the film thickness). The use of a transparent protection film with a retardation value in the film thickness direction (Rth) of −10 nm to +100 nm can substantially dissolve the coloration (optical coloration) of the polarizer caused by the transparent protection film. The retardation value in the thickness direction (Rth) is more preferably form −10 nm to +70 nm, particularly preferably from 0 nm to +50 nm. The retardation value in the film plane represented by $Re=(nx-ny)\times d$ is preferably 20 nm or less, more preferably 10 nm or less, preferably as close to 0 nm as possible.

The polarizing element and transparent protection film are adhered to each other via a water-based tacky adhesive. Examples of the water-based tacky adhesive include polyvinyl alcohol-based adhesives, gelatin-based adhesives, vinyl-based latex, water-based polyurethanes, and water-based polyesters.

The protection film may be subjected to hard coat or anti-reflection treatment or various treatments for the purposes of anti-sticking, diffusion, or anti-glare.

The hard coat treatment is carried out for preventing scratching on the polarizer surfaces by forming a curable film with excellent hardness or slipping characteristics, with a suitable acryl- or silicone-based ultraviolet curing resin, on the protection film surface. The anti-reflection treatment is carried out for preventing external light from reflecting on a polarizer surface and may be achieved by forming an anti-reflection film in accordance with a conventional manner. The anti-sticking treatment is carried out for preventing adhesion between the adjacent layers.

The anti-glare treatment is carried out for preventing the inhibition of visibility of a light transmitting through the polarizer caused by the reflection of the natural light on a polarizer surface, by forming fine irregularities on a protection film surface by roughing such as sand blasting or embossing or by blending transparent fine particles. Examples of the fine particles to be blended for forming the fine irregularity on the protection film surface include transparent fine particles, for example, inorganic fine particles of an average particle diameter of 0.5 to 50 μm, which may be electrically conductive, such as silica, alumina, titania, zirconia, tin oxide, indium oxide, cadmium oxide, and antimony oxide and organic fine particles such as cross-linked or uncross-linked polymers. When the fine irregularity is formed on the protection film surface, the amount of the fine particles is usually from 2 to 50 parts by weight, preferably from 5 to 25 parts by weight, on the basis of 100 parts by weight of the transparent resin forming the fine surface irregularity. The anti-glare layer may also be a diffusion layer (having a function of enlarging the viewing angle) for enlarging the light transmitting through the polarizer and thus enlarging the viewing angle. The anti-reflection layer, anti-sticking layer, diffusion layer and anti-glare layer may be formed integrally on the protection film or may be formed as an additional optical layer separately from the transparent protection layer.

There is no particular restriction on the first optical anisotropic layer as long as it is excellent in transparency and uniformity. However, the layer is preferably a polymeric stretched film or an optical compensation film formed from a liquid crystalline material. Examples of the polymeric stretched film include uniaxial or biaxial retardation films formed from cellulose-, polycarbonate-, polyarylate-, polysulfone-, polyacryl-, polyethersulfone-, or cyclic olefin-based polymers. The first optical anisotropic layers exemplified herein may be composed of a polymeric stretched film or an optical compensation film formed from a liquid crystalline material alone or in combination. Among these polymeric stretched films, preferred are cyclic olefin-based polymers and cellulose-based polymers because they are cost effective and can restrain the change of color modulation of image quality due to their film uniformity and small birefringence wavelength dispersion. Examples of the optical film formed from a liquid crystalline material include those comprised of various liquid crystalline polymeric compounds of main chain- and/or side chain-types, such as liquid crystalline polyesters, liquid crystalline polycarbonates, liquid crystalline polyacrylates, or low molecular weight liquid crystalline compounds having reactive groups which can be polymerized by cross-linking or the like after being aligned. These films may be a single-layered film with self-supportivity or formed over a transparent supporting substrate.

In the present invention, the retardation value Re1 of the first optical anisotropic layer at a wavelength of 550 nm is adjusted to from 120 to 250 nm. Re1 is the retardation value in the plane of the first optical anisotropic layer defined by $Re1=(nx1-ny1)\times d1$ [nm] wherein d1 indicates the thickness [nm] of the first optical anisotropic layer, $nx1$ and $ny1$ indicate the main refractive indices in the plane of the first optical anisotropic layer with respect to a 550 nm wavelength light, and $nx1>ny1$. When Re1 is larger than 250 nm or smaller than 120 nm, the resulting viewing angle improving effects would be poor.

The NZ coefficient NZ1 of the first optical anisotropic layer is adjusted to from 0.8 to 1.6, and particularly preferably from 1.0 to 1.4. Nz1 is defined by NZ1=(nx1−nz1)/(nx1−ny1) wherein nx1 and ny1 indicate the main refractive indices in the plane of the first optical anisotropic layer with respect to a 550 nm wavelength light, nz1 indicates the main refractive index in the thickness direction of the first optical anisotropic layer with respect to a 550 nm light and nx1>ny1. When NZ1 is larger than 1.6 or smaller than 0.8, the resulting viewing angle improving effects would be poor.

The first optical anisotropic layer is laminated over the surface of a polarizing element opposite to the surface on which a transparent protection film is laminated (attached). The transparent protection film may be contained between the polarizing element and the first optical anisotropic layer. However, the first optical anisotropic layer is preferably laminated directly on the polarizing element in view of durability or thickness.

The second optical anisotropic layer used in the present invention is a layer comprising at least a liquid crystal film produced by fixing a liquid crystalline polymer exhibiting an optically positive uniaxiality, more specifically a polymeric liquid crystalline compound exhibiting an optically positive uniaxiality or a polymeric liquid crystal composition containing at least one type of such polymeric liquid crystalline compounds and exhibiting an optically positive uniaxiality, in a nematic hybrid alignment with an average tilt angle of 5° to 50°, formed when the liquid crystalline polymeric compound or composition is in a liquid crystal state.

Figure 2:
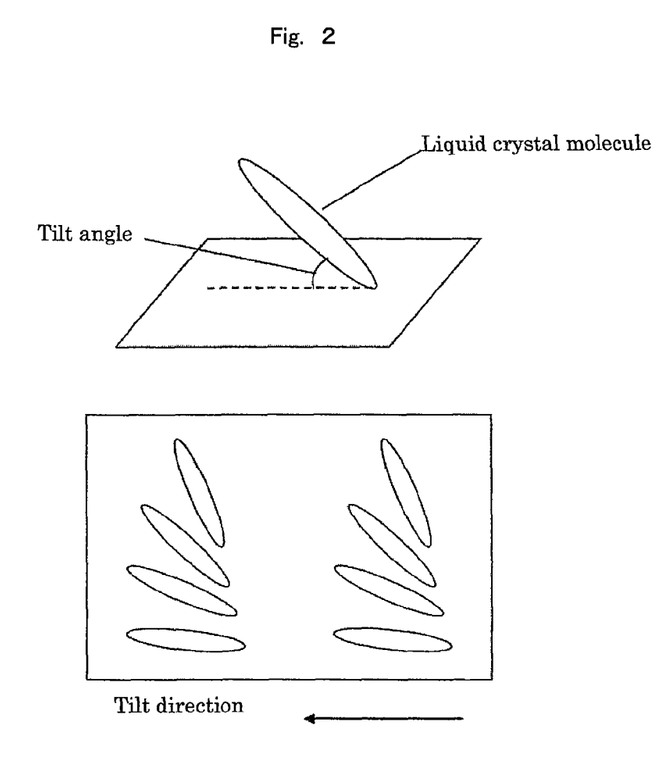
FIG. 2 is a is a schematic view for describing the aligned structure of the liquid crystal film forming the second optical anisotropic layer.

The term "nematic hybrid alignment" used herein refers to an alignment structure wherein the liquid crystal molecules are aligned in a nematic alignment wherein the angles of the directors of the liquid crystalline molecules relative to the film upper surface and the lower film surface are different from each other. Therefore, since the angles formed by the directors and the film planes are different between the vicinities of the upper and lower interfaces of the film, the nematic hybrid alignment can be referred to as an alignment wherein the angles vary continuously between the upper and lower film surfaces. The aligned structure of the nematic hybrid alignment is schematically shown in FIG. 2.

In a liquid crystal film with a fixed nematic hybrid alignment structure, the directors of the liquid crystalline molecules are directed at different angles in all the positions in the film thickness direction. Therefore, optical axis no longer exists when the film is viewed as the whole film structure. A compensation film fixed in such a nematic hybrid alignment is not optically equivalent at the film upper surface and at the film lower surface. Therefore, when the second optical anisotropic layer is arranged on the above-described TN liquid crystal cell, the viewing angle enlarging effect varies slightly depending on which surface faces the liquid crystal cell side. In the present invention, the second optical anisotropic layer is desirously arranged so that the surface in which the angle formed by the director of the liquid crystal polymer molecule and the film surface is larger, between the upper and lower surfaces is adjacent most to the liquid crystal cell.

The term "average tilt angle" used herein refers to an average value of the angles defined between the directors of the liquid crystalline molecules and a film plane, in the thickness direction of the liquid crystal film. In the liquid crystal film used in the present invention, the absolute value of the angle formed by a director in the vicinity of one of the film surfaces and the film surface is generally from 20 to 90 degrees, preferably from 40 to 90 degrees, more preferably from 70 to 90 degrees while the absolute value of the angle formed by the director and the other film surface is generally from 0 to 20 degrees, preferably from 0 to 10 degrees. The absolute value of the average tilt angle is generally from 5 to 50 degrees, preferably from 20 to 45 degrees, more preferably from 25 to 45 degrees, most preferably from 35 to 45 degrees. The average tilt angle, if deviating from the above ranges, would cause the contrast of the resulting liquid crystal display device to decrease when the device is viewed from an oblique direction. The average tilt angle can be determined by applying a crystal rotation method.

The liquid crystal film forming the second optical anisotropic layer used in the present invention may be a film formed from any liquid crystalline material with an optical positive uniaxiality as long as it is fixed in a nematic hybrid alignment and has a specific average tilt angle. For example, the second optical anisotropic layer may be a liquid crystal film produced by allowing a low molecular weight liquid crystalline substance to be in a liquid crystal state, and then aligning the substance in a nematic hybrid alignment and fixing the alignment by photo- or thermal- cross-linking or a liquid crystal film produced by allowing a liquid crystalline polymer to be in a liquid crystal state, and then aligning the polymer in a nematic hybrid alignment and fixing the alignment by cooling. The term "liquid crystal film" used herein refers to those produced by forming a liquid crystalline substance such as a low molecular weight or polymeric liquid crystalline substance into a film, regardless of whether or not the liquid crystal film itself exhibits liquid crystallinity.

Next, a method for producing the liquid crystal film used in the present invention will be described below. Although not restricted, the liquid crystal film may be produced by spreading the above-described liquid crystalline compound or composition over a substrate with alignability so as to be aligned and fixed in an aligned state by cooling and if necessary photo-irradiation and/or heat treatment. There is a case where the above-described first optical anisotropic layer may be used as such a substrate with alignability.

Examples of the method of forming a liquid crystal layer by spreading a liquid crystalline compound or composition over a substrate with alignability include a method wherein a liquid crystalline compound or composition in a molten state is directly coated over a substrate or a method wherein a solution of a liquid crystalline compound or composition is coated over a substrate and dried to evaporate the solvent.

Regardless of whether the liquid crystalline compound or composition is coated directly or in the form of a solution, there is no particular restriction on the method of coating the liquid crystalline compound or composition as long as the uniformity of the film layer can be maintained. For example, there may be used spin coating, die coating, curtain coating, dip coating, and roll coating methods.

The coating of a solution of a liquid crystalline compound or composition is preferably followed by a drying step for removal of the solvent after coating. There is no particular restriction on the drying step as long as it can maintain the uniformity of the coated film, which may be any conventional method. For example, there may be used a method using a heater (furnace) or a hot air blowing.

Next, the liquid crystal layer formed on the substrate is aligned in a liquid crystal state by heat treatment or the like and then cured by cooling and if necessary photo-irradiation and/or a heat treatment so as to be fixed in the alignment. During the first heat treatment, the liquid crystal composition is heated to a temperature in such a range that the liquid crystal composition exhibits a liquid crystal phase, so as to be aligned in a nematic hybrid alignment by its peculiar self-alignability. Since the conditions for the heat treatment vary in optimum conditions and limits depending on the liquid crystal phase behavior temperature (transition temperature) of the liquid crystal composition to be used, it can not be determined with certainty. However, the heat treatment is carried out at a temperature within the range of usually 10 to 250° C., preferably 30 to 160° C., more preferably at a temperature higher than the Tg of the liquid crystal composition, more preferably at a temperature higher by 10° C. or higher than the Tg of the liquid crystal composition. A too low temperature is not preferable because there is a possibility that the liquid crystal composition may not be aligned sufficiently, while a too high temperature is not also preferable because the substrate may be adversely affected. The heat treatment is carried out for usually 3 seconds to 30 minutes and preferably 10 seconds to 20 minutes. A heat treatment for shorter than 3 seconds is not preferable because there is a possibility that the liquid crystalline composition may not be aligned in a liquid crystal phase completely. Whereas, a heat treatment for longer than 30 minutes is not also preferable because the productivity is diminished.

In the case where there arise problems that the substrate is not optically isotropic, that the resulting liquid crystal film is opaque at a wavelength region where it is intended to be used, or that the alignment substrate is so thick that it causes a problem in practical use, the liquid crystal layer formed on the substrate may be transferred to another substrate which would not cause a problem at a wavelength region where it is intended to be used or a stretched film having a retardation function. The transferring method may be any conventional method. For example, as disclosed in Japanese Patent Laid-Open Publication Nos. 4-57017 and 5-333313, a method may be used in which after a substrate different from the substrate used for aligning is laminated via a tacky adhesive or adhesive described below over a liquid crystal layer on the alignment substrate and if necessary a tacky adhesive or adhesive is coated over the other surface, on which the liquid crystal film layer is not laminated, of the substrate film for transferring and then cured, only the liquid crystal film is transferred on the substrate film for transferring by releasing the alignment substrate.

In order that the elliptical polarizer produced by laminating the liquid crystal film exhibit more suitable viewing angle improving effects for a liquid crystal display device, the suitable thickness of the liquid crystal film can not be determined with certainty because it depends on the mode of a liquid crystal display device or various optical parameters but is usually from 0.2 µm to 10 µm, preferably from 0.3 µm to 5 µm, more preferably from 0.5 µm to 2 µm. A film thickness of less than 0.2 µm would fail to obtain sufficient improving effect (compensation). A film thickness of greater than 10 µm would cause unnecessary coloration on a liquid crystal display device.

With regard to an apparent retardation value in the plane of a liquid crystal film when viewed from the normal direction thereof, the refractive index ($n_e$) in the direction parallel to directors is different from the refractive index ($n_o$) in the direction perpendicular to directors, in a liquid crystal film with a fixed nematic hybrid alignment structure and, therefore, assuming that the value obtained by subtracting $n_o$ from $n_e$ be an apparent birefringence, an apparent retardation value is given as the product of the apparent birefringence and the absolute film thickness. This apparent retardation value is easily obtained by a polarization optical measurement such as ellipsometry. The apparent retardation value of the liquid crystal film used as the compensation element is usually from 30 to 150 nm, preferably from 30 to 130 nm, particularly preferably from 30 to 100 nm with respect to a monochromic light of 550 nm. An apparent retardation value of smaller than 30 nm would result in failure to attain a sufficient viewing angle widening effect. An apparent retardation value of larger than 150 nm would cause unnecessary coloration on the liquid crystal display device when viewed obliquely.

Next, description will be given of a method for producing the elliptical polarizer of the present invention.

There is no particular restriction in the order of laminating the components of the polarizer as long as they are structured in the order of the polarizer/first optical anisotropic layer/second optical anisotropic layer (the tacky adhesive or adhesive layer is omitted).

For example, they may be laminated in the order wherein (1) the polarizer, first optical anisotropic layer and second optical anisotropic layer are laminated in such a suitable order that they are constructed as described above, (2) the first optical anisotropic layer and the second optical anisotropic layer are laminated in turn on the polarizer, and (3) the polarizer is laminated on the first optical anisotropic layer and second optical anisotropic layer laminated in advance.

There is no particular restriction on the tacky adhesive or adhesive (hereinafter collectively referred to as "tacky/adhesive") forming the tacky adhesive layer or adhesive layer used for lamination as long as they have enough adhesivity to the optical anisotropic layers and do not harm the optical characteristics thereof. Examples include those containing a polymer such as an acrylic resin-based polymer, a methacrylic resin-based polymer, a silicone-based polymer, a polyester, a polyurethane, a polyamide, a polyether, or an epoxy resin-, ehtylene-vinyl acetate copolymer-, fluorine- or rubber-based polymer as a base polymer, and a mixture thereof. The tacky/adhesive may also be any of various reactive adhesives such as those of thermal curing and/or photo curing types, and electron radiation curing types. The tacky/adhesive may be an adhesive having a function of a transparent protection layer for protecting the optical anisotropic layers. It is particularly preferable to use a tacky adhesive such as an acrylic tacky adhesive which is excellent in optical transparency and in weather resistance and heat resistance and exhibits tackiness characteristics such as moderate wetness, cohesivity and adhesivity.

The tacky adhesive layer may be formed by any suitable method. Examples of the method include a method wherein a base polymer or a composition thereof is dissolved or dispersed in a solvent containing toluene or ethyl acetate alone or in combination thereby preparing a tacky/adhesive solution containing 10 to 40 percent by mass of the adhesive, which solution is then directly laid over the above-described optical anisotropic layer by an appropriate developing method such as casting or coating or a method wherein a tacky/adhesive layer is formed in accordance with the method as described above on a separator and then transferred onto the optical anisotropic layers. The tacky/adhesive layer may contain additives such as natural or synthetic resins, in particular fillers or pigments containing tackiness-imparting resins, glass fibers, glass beads, metal powders, and other inorganic powders, dyes, and anti-oxidants. The tacky/adhesive layer may contain fine particles so as to exhibit light diffusivity.

When the optical anisotropic layers are attached to one another via a tacky/adhesive layer, they may be subjected to a surface treatment so as to improve their adhesivity to the tacky/adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

The liquid crystal cell used in the present invention will be described. When the TN type liquid crystal cell is classified by its driving mode, it can be segmentalized into a simple matrix mode and an active matrix mode using active electrodes such as TFT (Thin Film Transistor) electrodes and TFD (Thin Film Diode) electrodes. The present invention can exhibit significant effects for a TN type liquid crystal cell of any driving mode.

The TN type liquid crystal cell used in the present invention has a retardation in the plane (Re) represented by the product of the refractive index anisotropy of the liquid crystal in the cell (Δn) and the thickness of the liquid crystal layer in the cell (d), within the range of usually from 250 to 520 nm, preferably from 300 to 500 nm, particularly preferably from 350 to 450 nm. If the retardation is larger than 520 nm, the cell would be poor in viewing angle improving effects when combined with a compensation film described below and would be slow in response speed. If the retardation is less than 250 nm, the cell is improved in viewing angle but would be reduced in front brightness or contrast when combined with the compensation film.

The liquid crystal molecules in the TN type liquid crystal cell is preferably provided with pre-tilt angle in order to diminish a deficiency in alignment of the molecules. The pre-tilt angle is usually 5° or smaller.

In general, the longitudinal axes of the nematic liquid crystal in the TN-type liquid crystal cell are twisted at an angle of 90° between the upper and lower substrates. When no electric voltage is applied to the NW mode TN-LCD, linearly polarized incident light exits at a twisted angle of 90° due to the optical rotation characteristics of the cell. When an electric voltage is applied, the longitudinal axes of the liquid crystal molecules are aligned in the electric field direction, and thus the optical rotation characteristics are lost. Therefore, the twisted angle of the TN type liquid crystal cell used in the present invention is usually from 70° to 110°, preferably from 85° to 95° in order to obtain the optical rotation characteristics sufficiently. The twisted direction of the liquid crystal molecules in the TN type liquid crystal cell may be left or right.

The configuration of the TN type liquid crystal display device using the elliptical polarizer of the present invention will be described.

The TN type liquid crystal display device of the present invention contains at least one sheet of the elliptical polarizer of the present invention but preferably contains one sheet of the elliptical polarizer on each side of the TN type liquid crystal cell. That is, the TN type liquid crystal display device is constructed in the order of "elliptical polarizer (in the order of polarizer/first optical anisotropic layer/second optical anisotropic layer)/TN type liquid crystal cell/elliptical polarizer (in the order of second optical anisotropic layer/first optical anisotropic layer/polarizer)/backlight from the viewer's side.

The angle defined by the pre-tilt direction of the liquid crystal layer in the liquid crystal cell and the tilt direction of the second optical anisotropic layer formed of a liquid crystal film fixed in a nematic hybrid alignment is preferably from 150 to 180 degrees, more preferably from 160 to 180 degrees, particularly preferably from 170 to 180 degrees. If the angle is smaller than 150 degrees, sufficient viewing angle compensation effect may not be obtained.

The angle defined by the slow axis of the first optical anisotropic layer and the tilt direction of the second optical anisotropic layer is preferably from 60 to 90 degrees, more preferably from 70 to 90 degrees, particularly preferably from 80 to 90 degrees. If the angle is smaller than 60 degrees, sufficient viewing angle compensation effect may not be obtained.

The angle defined by the absorption angle of the polarizer and the slow axis of the first optical anisotropic layer is preferably from 60 to 90 degrees, more preferably from 70 to 90 degrees, particularly preferably from 80 to 90 degrees. If the angle is smaller than 60 degrees, sufficient viewing angle compensation effect may not be obtained.

In addition to the above-described components, the liquid crystal display device of the present invention may be provided with other components. For example, the liquid crystal display device may be equipped with various types of retardation films produced by stretching transparent plastic films or sheets, films with a fixed liquid crystal alignment, light diffusion layers, backlights, light controlling films, light guide plates, prism sheets and color filters. The components may be appropriately selected from those that have been conventionally used.

EXAMPLES

The present invention will be further described in the following examples and comparative examples, but the present invention should not be construed as being limited thereto. The retardations (Re) in the examples are values at a wavelength of 550 nm, unless stated otherwise.

The refractive index and retardation of each optical film was determined by measuring the film plane and thickness main refractive indices nx, ny and nz with an automatic birefringence analyzer (KOBRA21ADH manufactured by Oji Scientific Instruments). The viewing angle (contrast contour lines) of each liquid crystal display device was measured with a viewing angle measuring instrument (EZ contrast 160R manufactured by ELDIM).

Example 1

(Polarizing Element)

A polyvinyl alcohol film was immersed in warm water to expand and then dyed with an iodine/potassium iodide solution. The film was uniaxially stretched in a boric acid aqueous solution thereby producing a polarizing element. As the result of measurement of the single transmittance, average transmittance and crossed transmittance of the polarizing element with a spectrophotometer, the transmittance and polarization efficiency were found to be 43.5% and 99.9%, respectively.

(First Optical Anisotropic Layer)

A 100 μm thickness norbornene unstretched film (Afton film manufactured by JSR Corporation) was biaxially stretched lengthwise and crosswise at 230° C. The resulting stretched film had a thickness of 80 μm, a retardation value Re1 of approximately 220 nm, and an NZ coefficient NZ1 of 1.2.

(Second Optical Anisotropic Layer)

A second optical anisotropic layer formed of a liquid crystal film having a thickness of 0.65 μm and fixed in a nematic hybrid alignment wherein the average tilt angle in the thickness direction was 44 degrees was produced in accordance with the disclosure of Japanese Patent Laid-Open Publication No. 6-347742. The retardation value of the second optical anisotropic layer was 70 nm.

(Elliptical Polarizer)

A triacetyl cellulose (TAC) film (40 μm, manufactured by Fuji Photo Film Co., Ltd.) was immersed in an aqueous solution of 2 mass % of potassium hydroxide at room temperature for 5 minutes to be saponified, and washed through flowing water and dried. The resulting saponified TAC film was attached via an acrylic adhesive on one of the surfaces of the polarizing element produced above thereby forming a transparent protection layer. The first optical anisotropic layer was attached via a tacky adhesive on the other surface of the polarizing element so that its slow axis is orthogonal to the absorption axis of the polarizing element. The second optical anisotropic layer was attached via a tacky adhesive on the first optical anisotropic layer so that its slow axis is parallel to the absorption axis of the polarizing element thereby producing an elliptical polarizer.

(Liquid Crystal Display Device)

Figure 3:
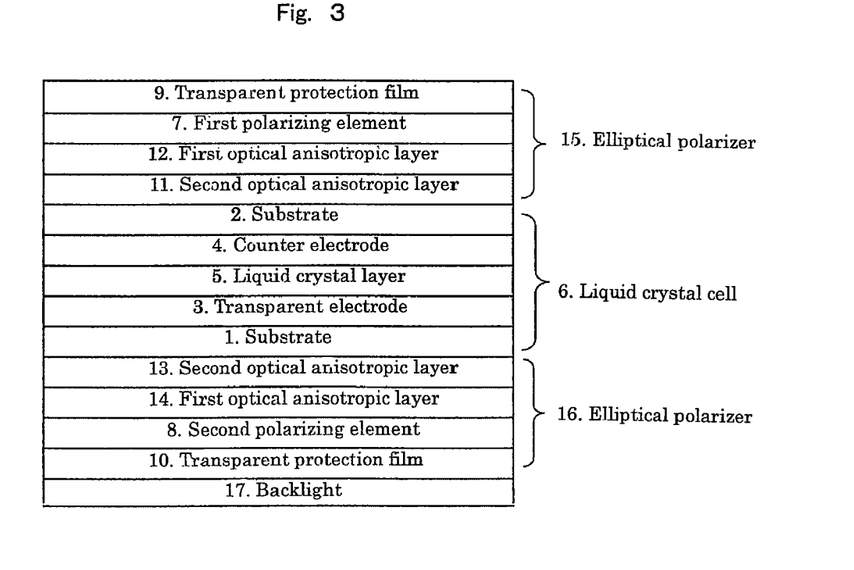
FIG. 3 is a schematic cross-sectional view of the liquid crystal display device of Example 1.

Referring to FIG. 3, the configuration of a liquid crystal display device equipped with the elliptical polarizer produced above will be described. The axis arrangement of the device will be described with reference to FIG. 4. On a substrate 1 is arranged a transparent electrode 3 formed from a highly transmissive material such as ITO while on a substrate 2 is arranged a counter electrode 4 formed from a highly transmissive material such as ITO. A liquid crystal layer 5 formed from a liquid crystalline material exhibiting a positive dielectric anisotropy is sandwiched between the transparent electrode 3 and the counter electrode 4. An elliptical polarizer 15 (composed of second optical anisotropic layer 11, first optical anisotropic layer 12, polarizing element 7 and transparent protection film 9) is arranged on the side of the substrate 2, opposite to the side on which the counter electrode 4 is formed while an elliptical polarizer 16 (composed of second optical anisotropic layer 13, a first optical anisotropic layer 14, a polarizing element 8 and transparent protection film 10) is arranged on the side of the substrate 1, opposite to the side on which the transparent electrode 3 is formed. A backlight 17 is arranged in the rear side of the transparent protection film 10, as viewed from the viewer.

Figure 4:
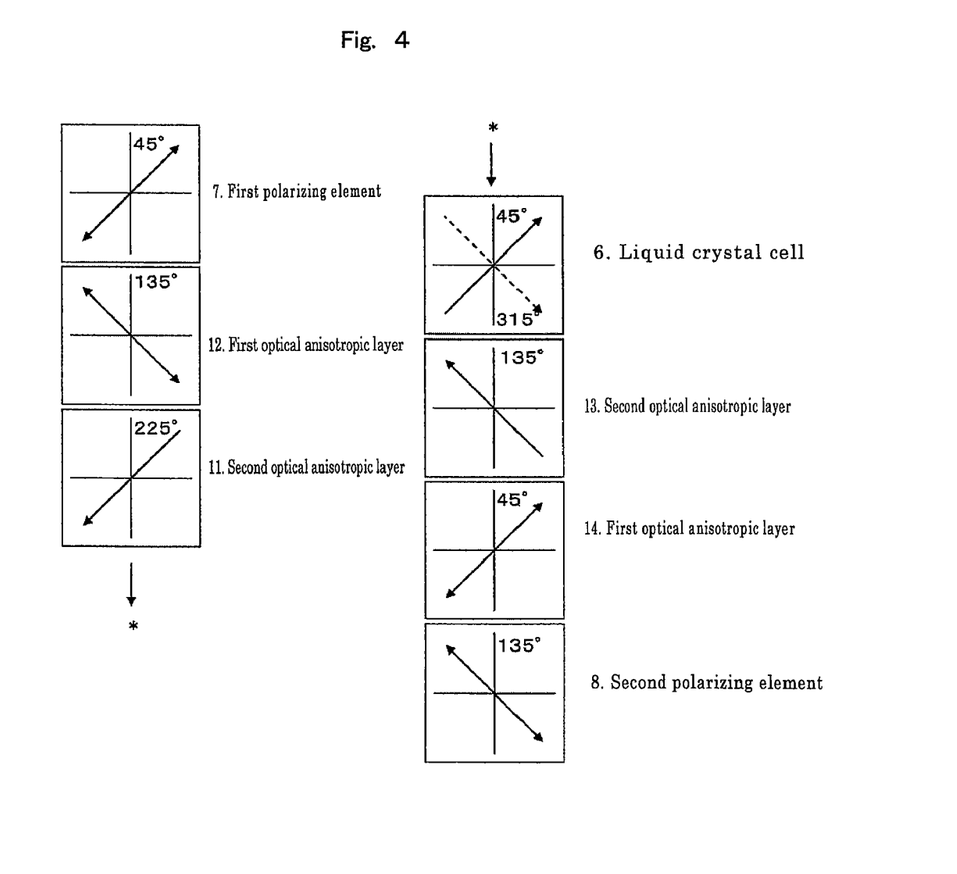
FIG. 4 is a plan view indicating the angular relation of the absorption axes of the polarizers, the slow axes of the polymeric stretched films, the tilt direction of the liquid crystal film and the pre-tilt direction of the liquid crystal cell in Example 1.

The liquid crystal cell 6 used in this example was produced using ZLI-4792 manufactured by Merck Ltd as a liquid crystalline material so that the liquid crystal layer thickness was 4.2 µm. The pre-tilt angle of the liquid crystal layer at the both substrate interfaces was 3 degrees, while Re of the liquid crystal cell was approximately 415 nm. FIG. 4 shows the absorption axis of the polarizing element, the slow axes of the first and second optical anisotropic layers, and the pre-tilt direction at the both liquid crystal cell interfaces.

Figure 5:
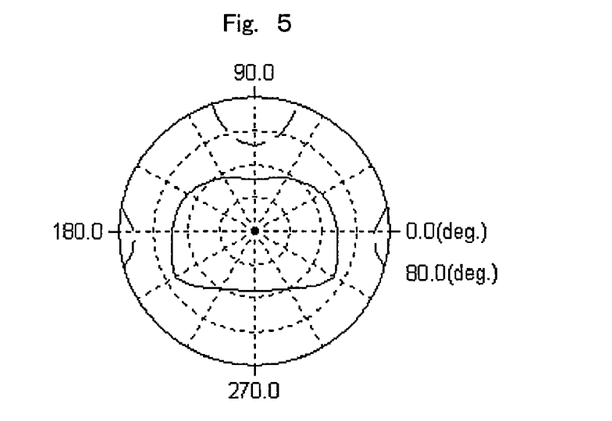
FIG. 5 is a view indicating the contrast ratio when viewing the liquid crystal display device of Example 1 from all the directions.

FIG. 5 shows the contrast ratio from all the directions defined by the transmissivity ratio of white image 0 V and black image 5 V "(white image)/(black image)". The solid line indicates a contrast ratio of 50. The concentric circles each indicate the same viewing angle and drawn to be at an interval of 20 degrees. Therefore, the outermost circle indicates 80 degrees from the center (the same is applied to the subsequent drawings).

From FIG. 5, it was confirmed that the liquid crystal display device had excellent viewing angle characteristics.

Example 2

Figure 6:
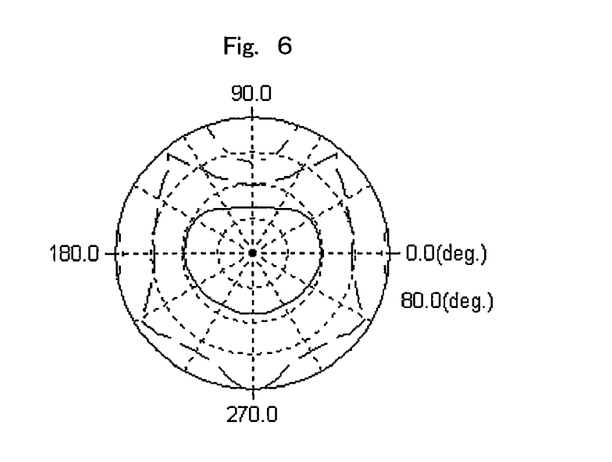
FIG. 6 is a view indicating the contrast ratio when viewing the liquid crystal display device of Example 2 from all the directions.

A liquid crystal display device that is similar to the device of Example 1 was produced with the same procedures except that the retardation Re1 and NZ coefficient NZ1 of the first optical anisotropic layer were 240 nm and 1.0, respectively, and the average tilt-angle and retardation of the second optical anisotropic layer were 37 degrees and 80 nm, respectively. FIG. 6 shows the contrast ratio from all the directions defined by the transmissivity ratio of white image 0 V and black image 5 V "(white image)/(black image)".

From FIG. 6, it was confirmed that the liquid crystal display device had excellent viewing angle characteristics.

Example 3

A liquid crystal display device that is similar to the device of Example 1 was produced with the same procedures except that the first optical anisotropic layer was produced by biaxially stretching a TAC film with a thickness of 50 µm (manufactured by Konica Minolta Opto, Inc.) at 160° C. and the retardation Re1 and NZ coefficient NZ1 thereof were approximately 220 nm and 1.2, respectively.

Figure 7:
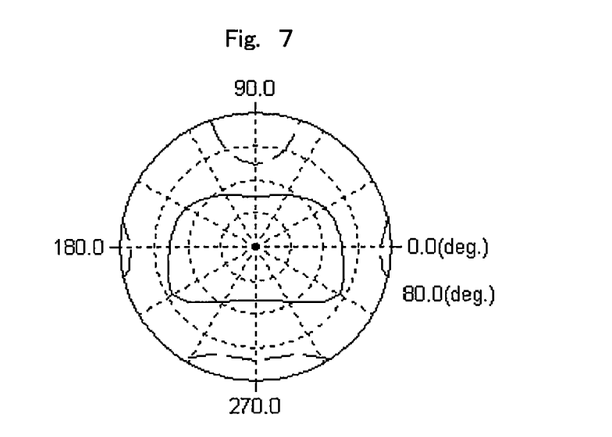
FIG. 7 is a view indicating the contrast ratio when viewing the liquid crystal display device of Example 3 from all the directions.

FIG. 7 shows the contrast ratio from all the directions defined by the transmissivity ratio of white image 0 V and black image 5 V "(white image)/(black image)".

From FIG. 7, it was confirmed that the liquid crystal display device had excellent viewing angle characteristics.

Comparative Example 1

Figure 8:
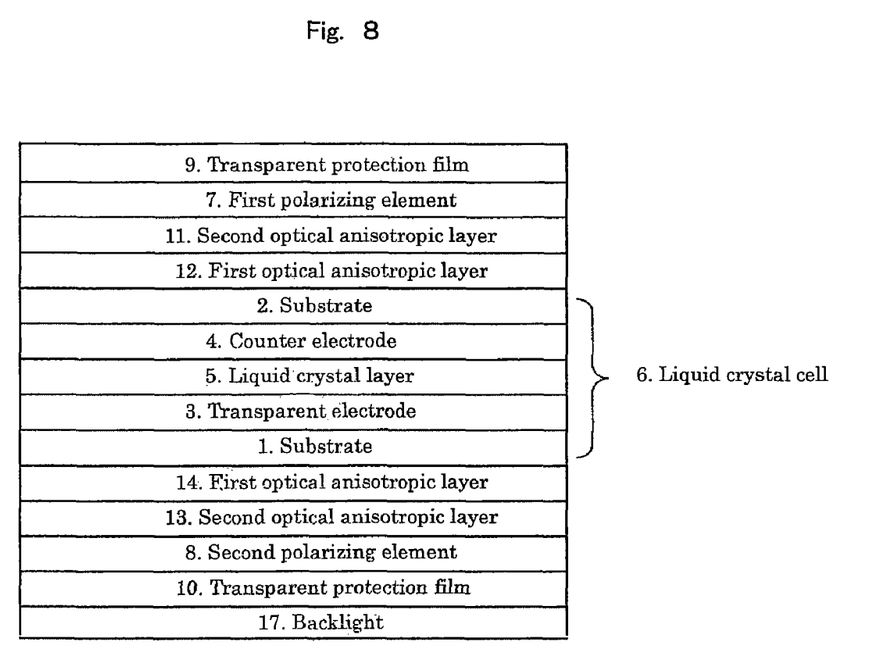
FIG. 8 is a schematic cross-sectional view of the liquid crystal display device of Comparative Example 1.

A liquid crystal display device that is similar to the device of Example 1 was produced with the same procedures except that the positions of the first and second optical anisotropic layers 12, 11 were switched to one another and the positions of the first and second optical anisotropic layers 14, 13 were switched to one another. The schematic configuration of the liquid crystal display device is shown in FIG. 8. The pre-tilt directions of the polarizing element, first and second optical anisotropic layers and the both liquid crystal cell interfaces are the same as those of Example 1 (FIG. 4).

Figure 9:
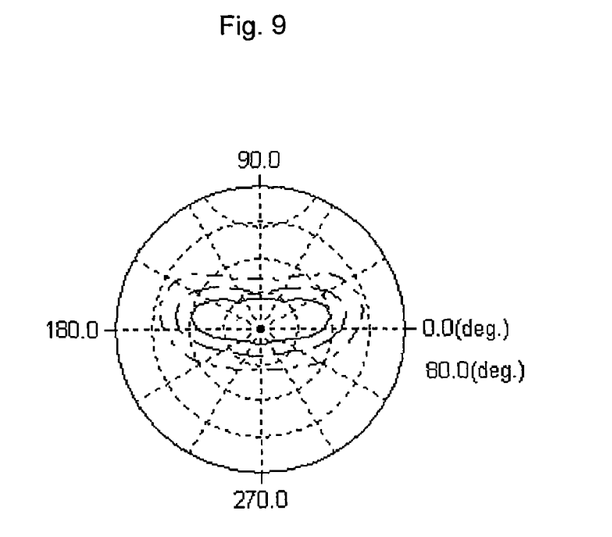
FIG. 9 is a view indicating the contrast ratio when viewing the liquid crystal display device of Comparative Example 1 from all the directions.

FIG. 9 shows the contrast ratio from all the directions defined by the transmissivity ratio of white image 0 V and black image 5 V "(white image)/(black image)".

With regard to viewing angle characteristics, Example 1 and Comparative Example 1 are compared. From FIGS. 5 and 9, it is confirmed that Comparative Example 1 was inferior in viewing angle characteristics to Example 1.

Comparative Example 2

Figure 10:
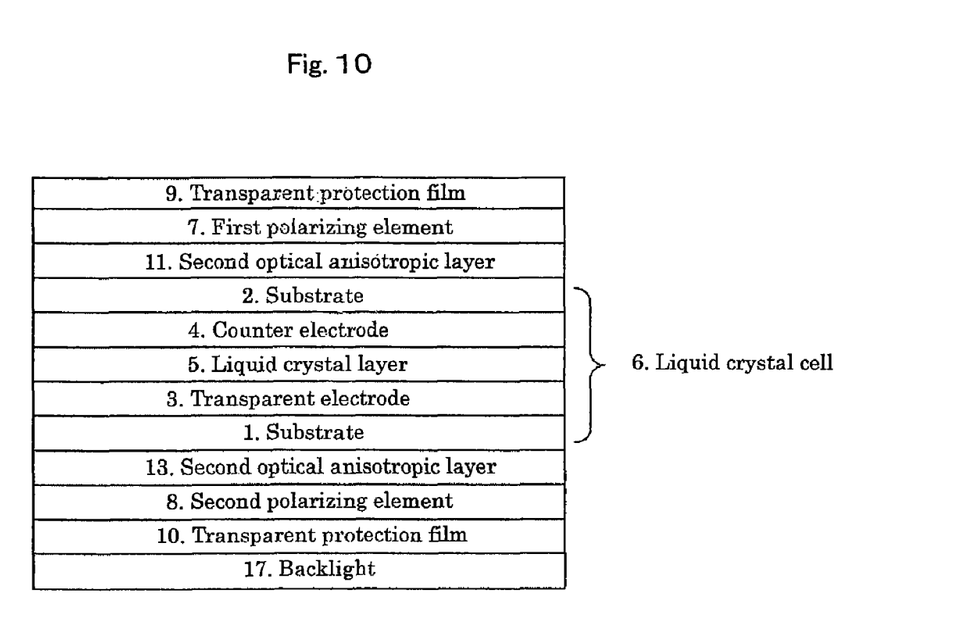
FIG. 10 is a schematic cross-sectional view of the liquid crystal display devices of Comparative Example 2 and 3.

A liquid crystal display device that is similar to the device of Example 1 was produced with the same procedures except that the first optical anisotropic layers 12, 14 were omitted. The schematic configuration of the liquid crystal display device is shown in FIG. 10.

Figure 11:
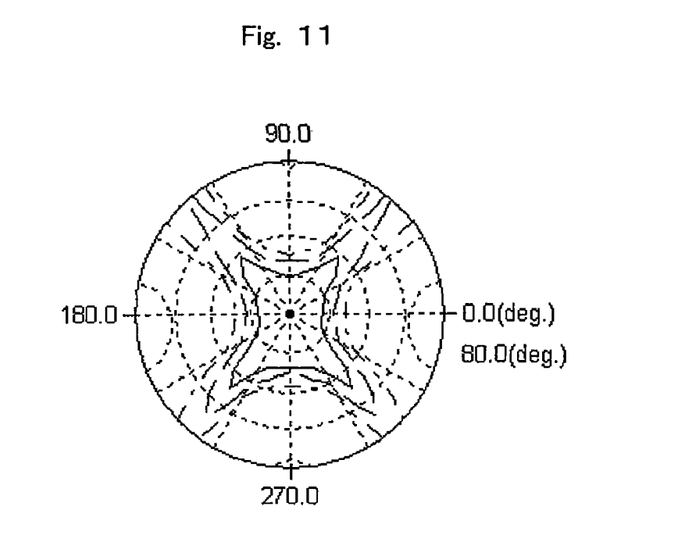
FIG. 11 is a view indicating the contrast ratio when viewing the liquid crystal display device of Comparative Example 2 from all the directions.

FIG. 11 shows the contrast ratio from all the directions defined by the transmissivity ratio of white image 0 V and black image 5 V "(white image)/(black image)".

With regard to viewing angle characteristics, Example 1 and Comparative Example 2 are compared. From FIGS. 5 and 11, it is confirmed that viewing angle characteristics were significantly improved using the first optical anisotropic layers.

Comparative Example 3

Figure 12:
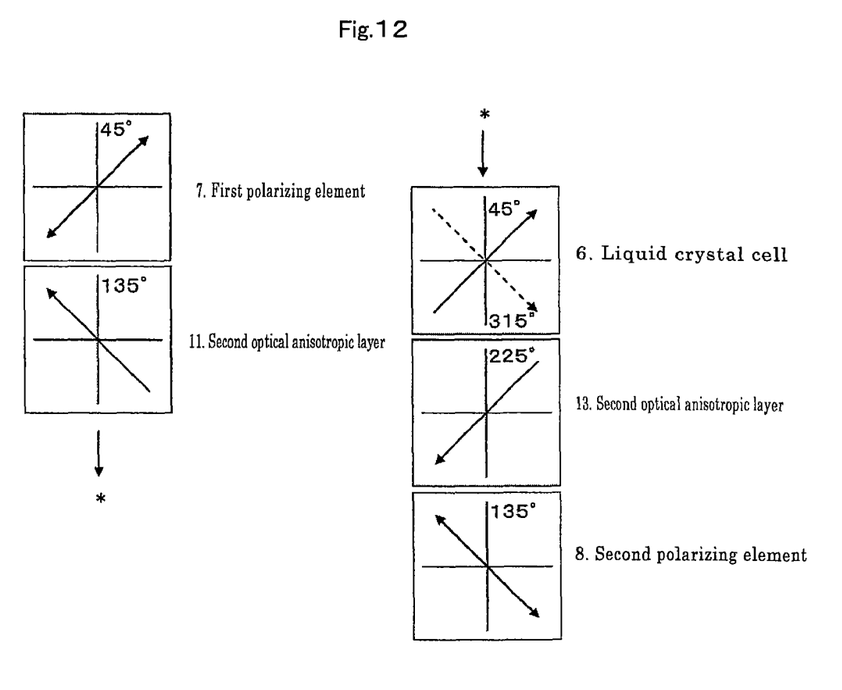
FIG. 12 is a plan view indicating the angular relation of the absorption axes of the polarizers, the tilt direction of the liquid crystal film and the pre-tilt direction of the liquid crystal cell in Comparative Example 3.
Figure 13:
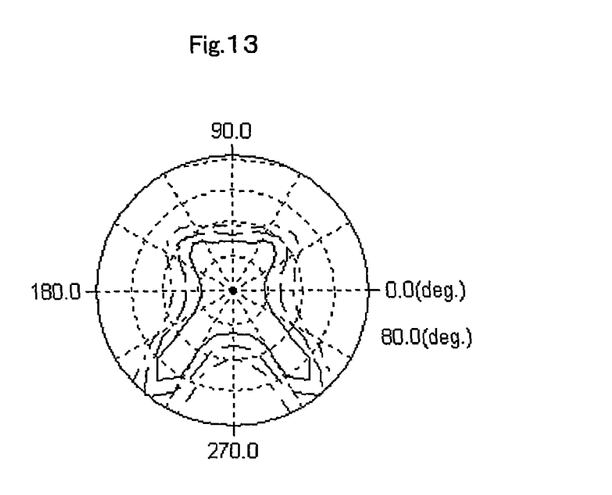
FIG. 13 is a view indicating the contrast ratio when viewing the liquid crystal display device of Comparative Example 3 from all the directions.

A liquid crystal display device was produced which was the same in the laminate configuration but different in the axis configuration from those of Comparative Example 2. The absorption axes of the polarizing elements 7, 8, the tilt-directions of the liquid crystal films 11, 12 and the pre-tilt direction at the both interfaces of the liquid crystal cell 6 were arranged as shown in FIG. 12. FIG. 13 shows the contrast ratio from all the directions defined by the transmissivity ratio of white image 0 V and black image 5 V "(white image)/(black image)".

With regard to viewing angle characteristics, Example 1 and Comparative Example 3 are compared. From FIGS. 5 and 13, it is confirmed that viewing angle characteristics were significantly improved using the first optical anisotropic layers.

The present invention is significantly large in industrial value because the present invention provides an elliptical polarizer that can significantly improve viewing characteristics of both contrast and gradation inversion and can provide a liquid crystal display device that is high in contrast and less in viewing angle dependency by equipping the elliptical polarizer on the liquid crystal cell.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An elliptical polarizer comprising:
a polarizer;
a first optical anisotropic layer; and
a second optical anisotropic layer, laminated in this order, the first optical anisotropic layer satisfying the requirements [1] and [2] below and being disposed so that the slow axis thereof is orthogonal to the absorption axis of the polarizer, the second optical anisotropic layer being a liquid crystal film having a retardation value in the plane of 30 to 150 nm with respect to a 550 nm wavelength light and fixed in a nematic hybrid alignment wherein the average tilt angle of the liquid crystal molecules of a liquid crystalline polymer exhibiting a positive optical uniaxiality is from 5° to 50° and being disposed so that the aligned direction of the second optical anisotropic layer is parallel to the absorption axis of the polarizer, and the elliptical polarizer being used in a twisted nematic (TN) type liquid crystal display device so that the second optical anisotropic layer is disposed on the liquid crystal cell side of the device:

$$0.8 \leq NZ1 \leq 1.6 \qquad [1]$$

$$120 \leq Re1 \leq 250 \qquad [2]$$

wherein $NZ1=(nx1-nz1)/(nx1-ny1)$, Re1 indicates the retardation value in the plane of the first optical anisotropic layer defined by $Re1=(nx1-ny1) \times d1$ [nm] wherein d1 indicates the thickness [nm] of the first optical anisotropic layer, nx1 and ny1 indicate the main refractive indices in the plane of the first optical anisotropic layer with respect to a 550 nm wavelength light, nz1 indicates the main refractive index in the thickness direction of the first optical anisotropic layer with respect to a 550 nm light, and $nx1>ny1$.

2. The elliptical polarizer according to claim 1, wherein the first optical anisotropic layer comprises a thermoplastic polymer containing a cyclic polyolefin resin.

3. The elliptical polarizer according to claim 1, wherein the first optical anisotropic layer comprises a thermoplastic polymer containing a cellulosic resin.

4. A TN type liquid crystal display device containing at least one elliptical polarizer according to claim 1.

5. A TN type liquid crystal display device comprising:
a first polarizer;
a first optical anisotropic layer;
a second optical anisotropic layer;
a TN type liquid crystal cell;
a second optical anisotropic layer;
a first optical anisotropic layer;
a second polarizer; and
a backlight, arranged in this order from the viewing side, the first optical anisotropic layers satisfying the requirements [1] and [2] below, the first optical anisotropic layer on the viewing side being disposed so that the slow axis thereof is orthogonal to the absorption axis of the first polarizer, the first optical anisotropic layer on the backlight side being disposed so that the slow axis thereof is orthogonal to the absorption axis of the second polarizer, each of the second optical anisotropic layers being a liquid crystal film having a retardation value in the plane of 30 to 150 nm with respect to a 550 nm wavelength light and fixed in a nematic hybrid alignment wherein the average tilt angle of the liquid crystal molecules of a liquid crystalline polymer exhibiting a positive optical uniaxiality is from 5° to 50°, the second optical anisotropic layer on the viewing side being disposed so that the aligned direction thereof is parallel to the absorption axis of the first polarizer, and the second optical anisotropic layer on the backlight side being disposed so that the aligned direction thereof is parallel to the absorption axis of the second polarizer:

$$0.8 \leq NZ1 \leq 1.6 \qquad [1]$$

$$120 \leq Re1 \leq 250 \qquad [2]$$

wherein $NZ1=(nx1-nz1)/(nx1-ny1)$, Re1 indicates the retardation value in the plane of each of the first optical anisotropic layers defined by $Re1=(nx1-ny1) \times d1$ [nm] wherein d1 indicates the thickness [nm] of each of the first optical anisotropic layers, nx1 and ny1 indicate the main refractive indices in the plane of each of the first optical anisotropic layers with respect to a 550 nm wavelength light, nz1 indicates the main refractive index in the thickness direction of each of the first optical anisotropic layers with respect to a 550 nm light, and $nx1>ny1$.

6. The TN type liquid crystal display device according to claim 4, wherein the first optical anisotropic layers each comprise a thermoplastic polymer containing a cyclic polyolefin resin.

7. The TN type liquid crystal display device according to claim 4, wherein the first optical anisotropic layers each comprise a thermoplastic polymer containing a cellulosic resin.

8. The TN type liquid crystal display device according to claim 4, wherein upon application of no electric voltage, the aligned direction of the liquid crystal molecules on the cell substrate on the viewing side, in the TN type liquid crystal cell is antiparallel to the aligned direction of the liquid crystal film fixed in a nematic hybrid alignment forming the second optical anisotropic layer on the viewing side, and the aligned direction of the liquid crystal molecules on the cell substrate on the backlight side is antiparallel to the aligned direction of the liquid crystal film fixed in a nematic hybrid alignment forming the second optical anisotropic layer on the backlight side.

9. The TN type liquid crystal display device according to claim 5, wherein the first optical anisotropic layers each comprise a thermoplastic polymer containing a cyclic polyolefin resin.

10. The TN type liquid crystal display device according to claim 5, wherein the first optical anisotropic layers each comprise a thermoplastic polymer containing a cellulosic resin.

11. The TN type liquid crystal display device according to claim 5, wherein upon application of no electric voltage, the aligned direction of the liquid crystal molecules on the cell substrate on the viewing side, in the TN type liquid crystal cell is antiparallel to the aligned direction of the liquid crystal film fixed in a nematic hybrid alignment forming the second optical anisotropic layer on the viewing side, and the aligned direction of the liquid crystal molecules on the cell substrate on the backlight side is antiparallel to the aligned direction of the liquid crystal film fixed in a nematic hybrid alignment forming the second optical anisotropic layer on the backlight side.

12. The TN type liquid crystal display device according to claim 6, wherein upon application of no electric voltage, the aligned direction of the liquid crystal molecules on the cell substrate on the viewing side, in the TN type liquid crystal cell is antiparallel to the aligned direction of the liquid crystal film fixed in a nematic hybrid alignment forming the second optical anisotropic layer on the viewing side, and the aligned direction of the liquid crystal molecules on the cell substrate on the backlight side is antiparallel to the aligned direction of the liquid crystal film fixed in a nematic hybrid alignment forming the second optical anisotropic layer on the backlight side.

13. The TN type liquid crystal display device according to claim 7, wherein upon application of no electric voltage, the aligned direction of the liquid crystal molecules on the cell substrate on the viewing side, in the TN type liquid crystal cell is antiparallel to the aligned direction of the liquid crystal film fixed in a nematic hybrid alignment forming the second optical anisotropic layer on the viewing side, and the aligned direction of the liquid crystal molecules on the cell substrate on the backlight side is antiparallel to the aligned direction of the liquid crystal film fixed in a nematic hybrid alignment forming the second optical anisotropic layer on the backlight side.

* * * * *